(12) United States Patent
Hwang

(10) Patent No.: US 6,204,082 B1
(45) Date of Patent: Mar. 20, 2001

(54) METHOD OF MANUFACTURING LIQUID CRYSTAL DISPLAY DEVICE

(75) Inventor: Jeung Tae Hwang, Kyoungki-do (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 0 days.

(21) Appl. No.: 09/342,610

(22) Filed: Jun. 29, 1999

(30) Foreign Application Priority Data

Jun. 30, 1998 (KR) ................................................ 98-25768

(51) Int. Cl.$^7$ ................................................... H01L 21/00
(52) U.S. Cl. .................................................. 438/30; 438/30
(58) Field of Search ........................ 438/30, 149, 151, 438/166, 257, 370, 563, 975, 401, 308

(56) References Cited

U.S. PATENT DOCUMENTS

| 5,466,618 | * | 11/1995 | Kim | 437/40 |
| 5,827,760 | * | 10/1998 | Seo | 438/161 |
| 5,913,113 | * | 6/1999 | Seo | 438/166 |
| 5,923,050 | * | 7/1999 | Jang et al. | 257/57 |
| 6,011,274 | * | 1/2000 | Gu et al. | 257/59 |
| 6,025,605 | * | 2/2000 | Lyu | 257/59 |

FOREIGN PATENT DOCUMENTS

| 563196 | 3/1993 | (JP) . |
| 8139328 | 5/1996 | (JP) . |
| 9266315 | 10/1997 | (JP) . |
| 1011029 | 1/1998 | (JP) . |
| 1020337 | 1/1998 | (JP) . |
| 10125923 | 5/1998 | (JP) . |

* cited by examiner

*Primary Examiner*—David Nelms
*Assistant Examiner*—David Nhu
(74) *Attorney, Agent, or Firm*—Selitto & Associates, P.C.

(57) ABSTRACT

A method of manufacturing a liquid crystal display device which can easily planarize the surface of a substrate and obtain a high aperture ratio, is disclosed.

According to the present invention, firstly a first metal layer is formed a transparent insulating substrate. The portion of the first metal layer is then anodized, to define a gate and to form a first oxide layer on the substrate at both sides of the gate. Next, a gate insulating layer is formed on the overall substrate and a channel layer is formed on the gate insulating layer over the gate. Ohmic layers are then formed on the gate insulating layer to be overlapped with both side of the channel layer and a second metal layer is formed on the overall substrate. Thereafter, the portion of the second metal layer is anodized, to define source and drain on the ohmic layers and to form a second oxide layer. An insulating layer is then formed on the overall substrate and etched to expose the portion of the source, thereby forming a contact hole. Thereafter, a pixel electrode is formed on the insulating layer to be in contact with the source through the contact hole. In this embodiment, the first metal layer is formed of an aluminum and the insulating layer formed of a SiNx layer. Furthermore, the channel layer is formed using a photoresist layer pattern formed by back-exposure using the gate as an exposure mask.

10 Claims, 4 Drawing Sheets

METHOD OF MANUFACTURING LIQUID CRYSTAL DISPLAY DEVICE

BACKGROUND OF THE INVENTION

1. Field of the Invention

The present invention relates to a method of manufacturing a liquid crystal display device, and more particularly to a method of manufacturing a liquid crystal display device having a high aperture ratio.

2. Description of the Related Art

In general, an active matrix type-liquid crystal display (AM-LCD) devices is thin, so that it is often used in various display devices. In this AM-LCD device, one TFT is provided as a switching element for each pixel, so that individual pixel electrodes are independently driven. The contrast is therefore not reduced based upon the reduction of a duty ratio, and also the angle of visibility is not reduced, even when the capacity of display is increased to increase the number of lines.

To improve aperture ratio of LCD panel, a method overlapping a pixel electrode with portions of a gate line and a data line, is proposed.

FIG. 1 shows a cross section view of a conventional AM-LCD having a high aperture ratio.

Referring to FIG. 1, a gate 12 is formed on a transparent insulating substrate such as a glass. A gate insulating layer 13 is then formed on the substrate in which the gate 12 is formed. A channel layer 14 is formed on the gate insulating layer 13 over the gate 12 and an etch stopper 15 is formed thereon. Ohmic layers 16a and 16b are formed on the channel layer 14 so that they overlap with both side of the etch stopper 15 and expose its upper portion. On the ohmic layers 16a and 16b are formed drain and source 17a and 17b. A resin layer 18 as a layer for intermediate insulation and planarization, is coated on the overall substrate and then etched to expose the portion of the source 16b, thereby forming a contact hole H1. An ITO layer is deposited on the contact hole H1 and the resin layer 18 and then patterned, to form a pixel electrode 19. At this time, the pixel electrode 19 is formed to overlapped with portions of a gate line and a data line, as not shown in FIG. 1.

However, the resin layer 18 used for planarization, is a high price, to raise production cost.

Furthermore, when forming the pixel electrode 19, interface properties between the resin layer 18 and the ITO layer are bad, so that defects occur.

Moreover, addition coater is required for forming the resin layer 18.

SUMMARY OF THE INVENTION

It is therefore an object of the present invention to a method of manufacturing a liquid crystal display device which can easily planarize the surface of a substrate and obtain a high aperture ratio, without employing a resin layer.

To accomplish this above object, according to the present invention, firstly a first metal layer is formed a transparent insulating substrate. The portion of the first metal layer is then anodized, to define a gate and to form a first oxide layer on the substrate at both sides of the gate. Next, a gate insulating layer is formed on the overall substrate and a channel layer is formed on the gate insulating layer over the gate. Ohmic layers are then formed on the gate insulating layer to be overlapped with both side of the channel layer and a second metal layer is formed on the overall substrate. Thereafter, the portion of the second metal layer is anodized, to define source and drain on the ohmic layers and to form a second oxide layer. An insulating layer is then formed on the overall substrate and etched to expose the portion of the source, thereby forming a contact hole. Thereafter, a pixel electrode is formed on the insulating layer to be in contact with the source through the contact hole.

In this embodiment, the first metal layer is formed of an aluminum and the insulating layer formed of a SiNx layer.

Furthermore, the channel layer is formed using a photoresist layer pattern formed by back-exposure using the gate as an exposure mask.

Additional object, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE INVENTION

Hereinafter, a preferred embodiment of the present invention will be explained in more detail with reference to accompanying drawings.

FIG. 2A to FIG. 2G shows cross sectional views for describing a method of manufacturing a liquid crystal display device according to an embodiment of the present invention.

Figure 1:
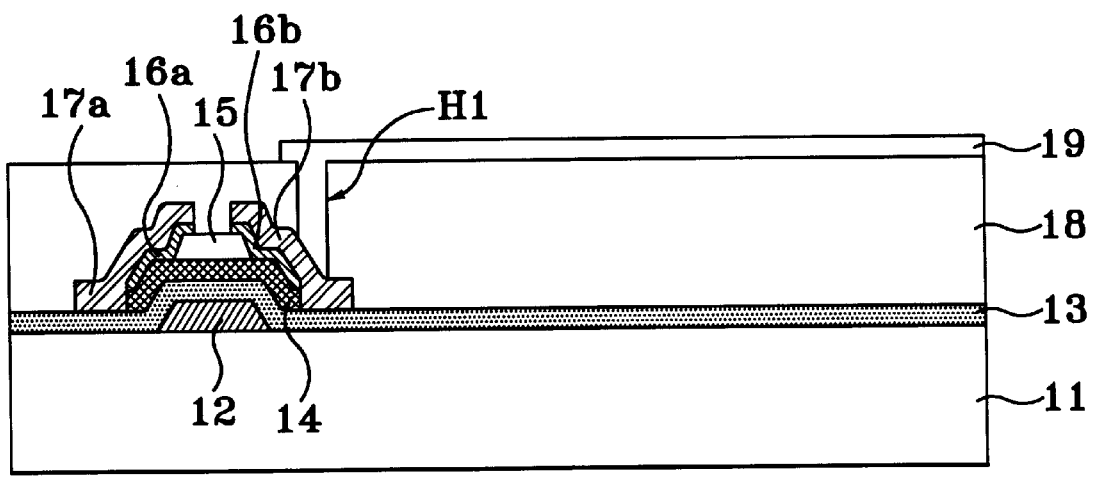
FIG. 1 shows a cross sectional view for describing a method of manufacturing a conventional liquid crystal display device having a high aperture ratio.
Figure 2A:
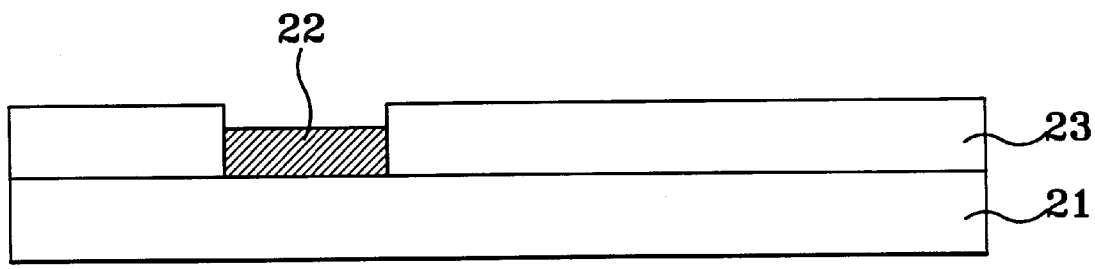
FIG. 2A to FIG. 2G show cross sectional views for describing a method of manufacturing a liquid crystal display device according to an embodiment of the present invention

Referring to FIG. 2A, a first metal layer is deposited a transparent insulating substrate 21 such as a glass. The first metal is formed of a aluminum layer. A first photoresist layer pattern(as not shown) is then formed by photolithography using a first mask. The portion of the first metal exposed by the first photoresist layer pattern is oxidized by anodizing, to be transformed into a first oxide layer 23 such as $Al_2O_3$ and to define a gate 22. At this time, owing to thickness increase to oxidation, the first oxide layer has a thickness increased about 20% to the gate 22.

Figure 2B:
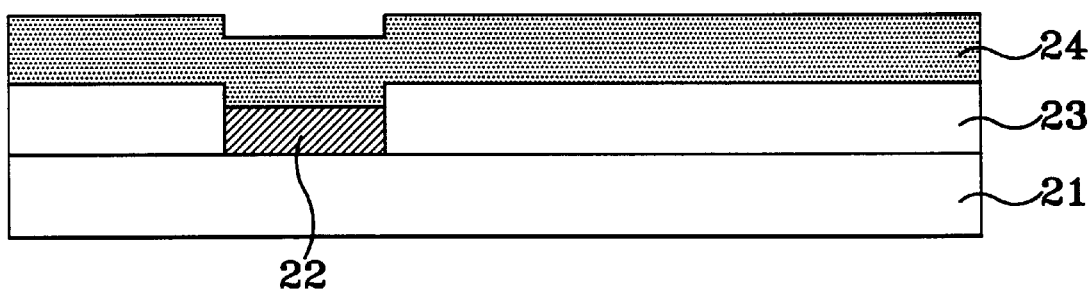

Thereafter, the photoresist layer pattern is removed by a well known method and a gate insulating layer 24 is formed on the overall substrate, as shown in FIG. 2B. The gate insulating layer 24 is formed of a SiNx layer.

Figure 2C:
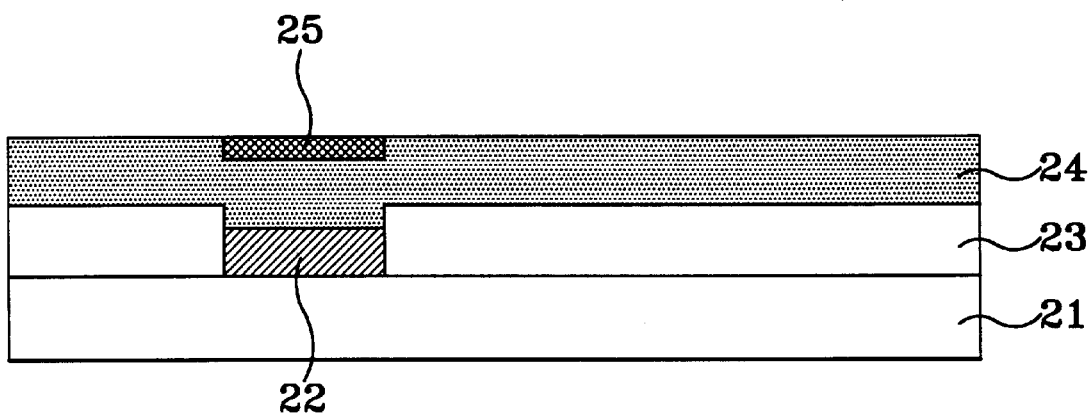

Referring to FIG. 2C, on the gate insulating layer 24 deposited a semiconductor layer such as an amorphous silicon. A photoresist layer(as not shown) is coated on the semiconductor layer and exposed by back-exposure using the gate 22 as an exposure mask, to form a second photoresist layer pattern. Namely, additional mask is not required because of using the gate 22 as the exposure mask. Next, the semiconductor layer is patterned using the second photoresist layer pattern, to form a channel layer 25 on the gate insulating layer 24 over the gate 22. The second photoresist layer pattern is then removed by a well-known method.

Figure 2D:
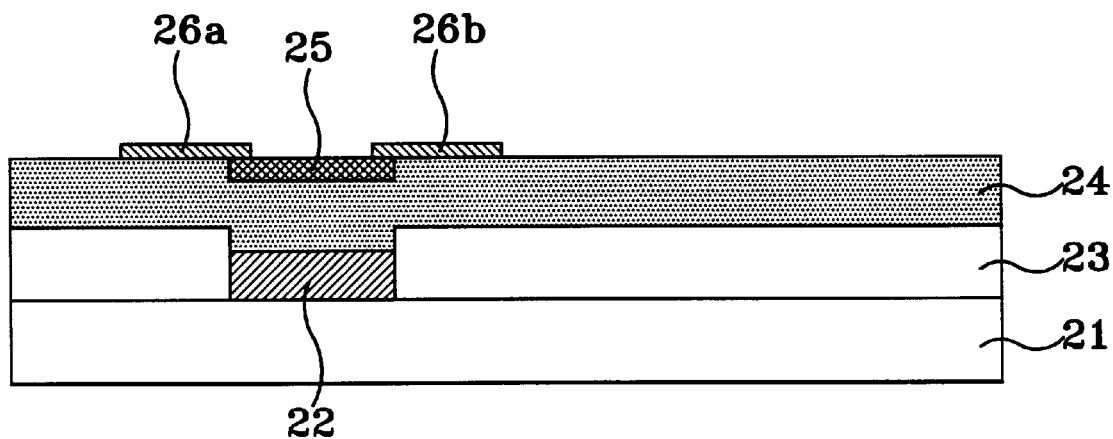

Referring to FIG. 2D, a doped semiconductor layer such as N+ amorphous silicon is deposited on the structure of FIG. 2C and a third photoresist layer pattern(as not shown) is formed thereon by photolithography using a second mask. The doped semiconductor layer is then patterned using the third photoresist layer pattern, to form ohmic layers 26a and 26b on the gate insulating layer with overlapping with both sides of the channel layer 25. Thereafter, the third photoresist layer pattern is removed by a well known method.

Figure 2E:
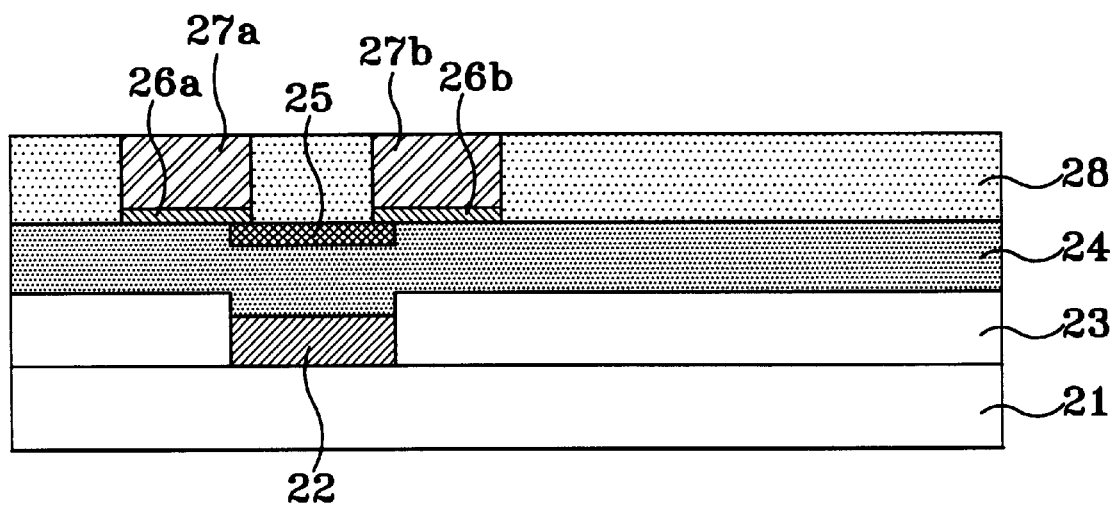

Referring to FIG. 2E, a second metal layer is deposited on the structure of FIG. 2D and a fourth photoresist layer pattern(as not shown) is formed thereon by photolithography using a third mask. The portion of the second metal exposed by the second photoresist layer pattern is oxidized by anodizing, to be transformed into a second oxide layer 28 and to define a drain and a source 27a and 27b. At this time, a data line is simultaneously defined as not shown in FIG. 2E. Next, the fourth photoresist layer pattern is removed by a well known method. Here, owing to thickness increase to oxidation, the second oxide layer 28 has a thickness increased as the ohmic layers 26a and 26b, so that the upper surface of the substrate is smooth, as shown in FIG. 2E.

Figure 2F:
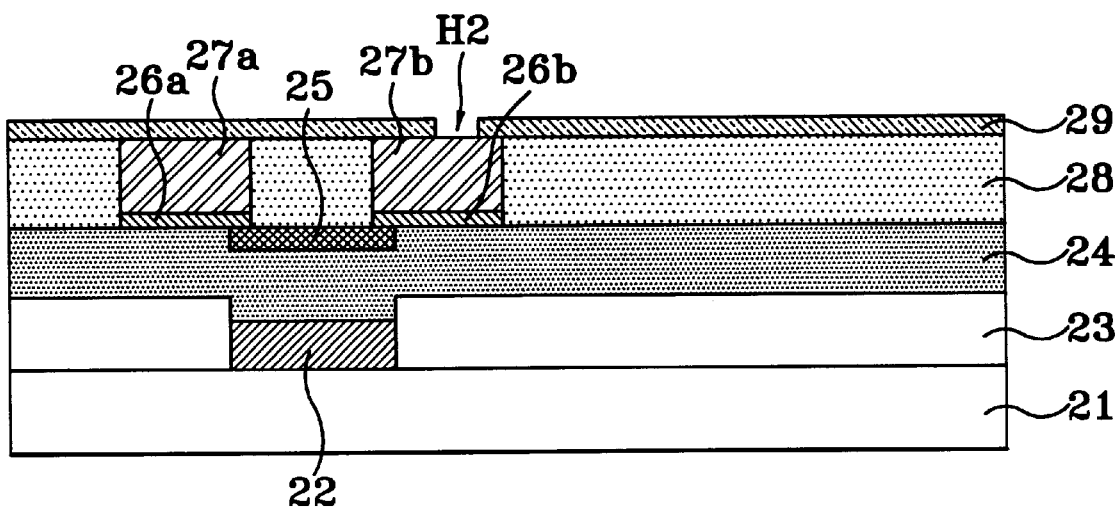

Referring to FIG. 2F, a SiNx layer 29 as an insulating layer is deposited on the structure of FIG. 2E. The SiNx layer 29 has good interface properties to an ITO layer which will be deposited thereon after. A fifth photoresist layer pattern (as not shown) is then formed on the SiNx layer 29 by photolithography using a fourth mask. Thereafter, the SiNx layer 29 is etched using the fifth photoresist layer pattern to expose the portion of the source 27b, thereby forming a contact hole H2. The fifth photoresist layer pattern is removed by a well known method.

Figure 2G:
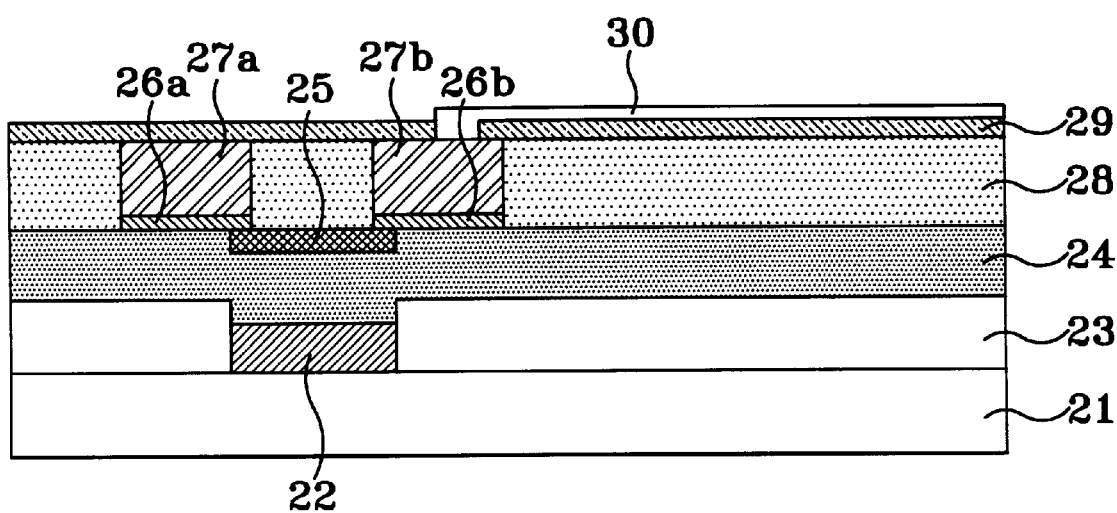

Referring to FIG. 2G, the ITO layer is deposited on the contact hole H2 and the SiNx layer 29 and a sixth photoresist layer pattern(as not shown) is formed thereon by photolithography using a fifth mask. The ITO layer is then patterned using the sixth photoresist layer pattern, to form a pixel electrode 30. At this time, the pixel electrode 30 is formed to overlap with a gate line and the data line, as not shown in FIG. 2G.

According to the present invention as above described, since a gate and source/drain are defined by anodizing in manufacturing a liquid crystal display device having high aperture ratio, planarization is easy without using additional planarization layer such as a resin, thereby decreasing production cost.

Furthermore, a SiNx layer as an insulating layer is formed under an ITO layer to improve interface properties therebetween, thereby preventing defects.

Moreover, since a photoresist layer pattern for a channel layer is formed by back-exposure using a gate as exposure mask, without using additional mask, only five masks are required, thereby simplifying process.

Although the preferred embodiment of this invention has been disclosed for illustrative purpose, those skilled in the art will appreciate that various modification, additions and substitutions are possible, without from the scope and spirit of the invention as described in the accompanying claims.

What is claimed is:

1. A method of manufacturing a liquid crystal display device, comprising the steps of:
   forming a first metal layer on a transparent substrate;
   oxidizing at least one portion of the first metal layer to define a gate and to form a first oxide layer on the substrate on both sides of the gate;
   forming a gate insulting layer on the overall substrate;
   forming a channel layer on the gate insulating layer over the gate;
   forming ohmic layers on the gate insulating layer, each of the ohmic layers overlapping with a corresponding one of sides of the channel layer;
   forming a second metal layer on the overall substrate;
   oxidizing at least one portion of the second metal layer to define a source and a drain on the ohmic layers and to form a second oxide layer;
   forming an insulating layer on the overall substrate;
   etching the insulating layer to expose a portion of the source, thereby forming a contact hole; and
   forming a pixel electrode on the insulating layer, the pixel electrode being in contact with the source through the contact hole.

2. The method according to claim 1, wherein the first metal layer is oxidized by an anodizing process.

3. The method according to claim 1, wherein the second metal layer is oxidized by an anodizing process.

4. The method according to claim 1, wherein the step of forming the channel layer comprises the steps of:
   forming a semiconductor layer on the gate insulating layer;
   coating a photoresist layer on the semiconductor layer;
   forming a photoresist layer pattern by back-exposing the photoresist layer using the gate as exposure mask; and
   patterning the semiconductor layer using the photoresist layer pattern, to form the channel layer.

5. The method according to claim 1, wherein the first metal layer is formed of an aluminum layer.

6. The method according to claim 1, wherein the insulating layer is formed of a SiNx layer.

7. The method according to claim 1, wherein the pixel electrode layer is formed of an ITO layer.

8. The method according to claim 1, wherein said step of oxidizing said at least one portion of the second metal layer is performed such that exposed surfaces of the source and the drain are substantially leveled with an exposed surface of the second oxide layer, whereby planarization of an associated thin film transistor can be achieved without the use of an additional planarization layer.

9. The method according to claim 8, wherein said step of forming the channel layer is performed such that an exposed surface of the channel layer is substantially leveled with an exposed surface of the gate insulating layer.

10. The method according to claim 8, wherein the insulating layer has a substantially uniform thickness throughout its width.

* * * * *